United States Patent [19]

Hayakawa

[11] Patent Number: 5,041,936
[45] Date of Patent: Aug. 20, 1991

[54] MAGNETIC RECORDING TRANSDUCER ASSEMBLY WITH TWO GAPS OF DIFFERENT LENGTH

[75] Inventor: Yuichi Hayakawa, Tokyo, Japan
[73] Assignee: NEC Corporation, Tokyo, Japan
[21] Appl. No.: 390,950
[22] Filed: Aug. 9, 1989

[30] Foreign Application Priority Data

Aug. 9, 1988 [JP] Japan .................................. 63-199435

[51] Int. Cl.⁵ ............................................ G11B 5/265
[52] U.S. Cl. ..................................... 360/121; 360/118
[58] Field of Search ............... 360/121, 123, 102, 163, 360/118

[56] References Cited

U.S. PATENT DOCUMENTS 3,846,840 11/1974 Childers et al. ...................... 360/121
4,803,571 2/1989 Fujioka et al. ....................... 360/121
4,805,051 2/1989 De Marco et al. .................. 360/121
4,933,795 6/1990 Nigan .................................... 360/121

FOREIGN PATENT DOCUMENTS 0028913 2/1987 Japan .

OTHER PUBLICATIONS

"Variable Track Density Magnetic Head", IBM TDB, Jul. 1985, vol. 28, No. 2, p. 558.

Primary Examiner—David J. Severin
Attorney, Agent, or Firm—Sughrue, Mion, Zinn, Macpeak & Seas

[57] ABSTRACT

A magnetic transducer assembly for cooperating with a relatively moving magnetic recording medium to magnetically record and reproduce information on and from the magnetic recording medium. The transducer assembly comprises first and second magnetic transducers incorporated into one rail of a double-rail type slider with they are adjacent to each other. The rail has a contacting surface with a recording surface of the recording medium in recording and reproducing. The first magnetic transducer includes a first read/write core assembly having a first magnetic gap extending in directions normal to the moving direction of the recording medium and placed in a plane including the contacting surface of the rail. The second magnetic transducer includes a second read/write core assembly having a second magnetic gap which is different in length from the first magnetic gap and extends in directions normal to the moving direction thereof. The second magnetic gap is positioned in the plane including the contacting surface thereof and arranged so that its longitudinal axis is on an extension line of the longitudinal axis of the first magnetic gap.

9 Claims, 9 Drawing Sheets

MAGNETIC RECORDING TRANSDUCER ASSEMBLY WITH TWO GAPS OF DIFFERENT LENGTH

BACKGROUND OF THE INVENTION

The present invention relates generally to a magnetic recording transducer assembly used in magnetic disc apparatus to magnetically record and reproduce information on and from a disc-like recording medium such as a floppy disk, and more particularly to such a transducer assembly including a high-density recording magnetic transducer and a low-density recording magnetic transducer which are incorporated into a double-rail type slider having contact surfaces which contact with a recording surface of the disc-like recording medium in recording and reproducing.

Various magnetic recording transducer assemblies have been devised heretofore, where two or more magnetic transducers are provided therein with a view to accommodating magnetic recording media with different track-densities. One example of such recording transducer assemblies is disclosed in Japanese Patent provisional Publication No. 62-28913, the technique of which is arranged such that first and second magnetic transducers for different track-density recording are built in one rail of a double-rail type slider. An important aspect in the different track-density recording art comes in the need for the high-density and low-density magnetic transducers being contiguous or adjacent to each other in assembling, because limitation tend to be imposed on the moving amount of the transducer assembly with respect to some disc-like recording media such as a 3.5-inch floppy disk so as to fail to satisfy the interchangeability for different track-density media. However, the aforementioned conventional magnetic transducer assembly has proven to be unsatisfactory in terms of meeting the contiguity requirement of the high-density and low-density magnetic transducers. More specifically, as obvious from FIG. 1 read/write coils 3, 4 which are wound around leg portions of core assemblies 5, 6 contact with each other when assembled and thus render it difficult to adequately bring the low-density magnetic transducer 1 close to the high-density magnetic transducer 2. Thus, improvement in arrangement is required from the viewpoint of allowing the contiguity to each other in assembling.

SUMMARY OF THE INVENTION

It is therefore an object of the present invention to provide a magnetic recording transducer assembly which is capable of adequately accommodating different track-density media in recording and reproducing.

With this and other objects which will become apparent as the description proceeds, a magnetic recording transducer assembly according to the present invention, which cooperates with a relatively moving magnetic recording medium to magnetically record and reproduce information on and from the magnetic recording medium, comprises first and second magnetic transducers incorporated into one rail of a double-rail type slider extending in a direction of movement of the recording medium, each rail having a contacting surface with a recording surface of the recording medium in recording and reproducing. The first magnetic transducer includes a first read/write core assembly having a first magnetic gap extending in directions normal to the moving direction of the recording medium to write a track of information on the recording medium. The first magnetic gap is placed in a plane including the contacting surface of said rail thereof. The second magnetic transducer includes a second read/write core assembly having a second magnetic gap which is different in length from the first magnetic gap and extends in directions normal to the moving direction of the recording medium to write another track of information on the recording medium. The second magnetic transducer is arranged so as to be adjacent to the first magnetic transducer. The second magnetic gap is positioned in the plane involving the contacting surface of the rail thereof and arranged so that its longitudinal axis is on an extension line of the longitudinal axis of the first magnetic gap. The first magnetic transducer further includes an erase core assembly having an erase gap which is arranged to be in contacting relationship to the first read/write core assembly in the moving direction of the recording medium so as to erase the edges of the written track immediately after it is written by said first magnetic gap.

The first read/write core assembly includes first and second core leg portions which extend in directions normal to the recording surface of the recording medium and which are spaced by a predetermined distance from each other so that the first core leg portion is positioned to precede the second core leg portion in the direction opposite to the moving direction of the recording medium. The erase core assembly includes a third core leg portion which extends in a direction normal to the recording surface thereof and which is positioned to be spaced by a predetermined distance from the second core leg portion in the moving direction of the recording medium whereby the first to third core leg portions are successively arranged in order along one line. Further, the second read/write core assembly includes fourth and fifth core leg portions which extend in directions normal to the recording surface thereof and which are spaced by a predetermined distance from each other so that said fourth core leg portion is positioned to precede the fifth core leg portion in the direction opposite to the moving direction of the recording medium whereby the fourth and fifth core leg portions are arranged in order along one line. The fourth core leg portion is positioned between the first and second core leg portions in the moving direction of the recording medium and the fifth core leg portion is positioned between the second and third core leg portions in the moving direction thereof.

A read/write coil of the first magnetic transducer is wound around the first core leg portion and a read/write coil of the second magnetic transducer is wound around the fifth core leg portion. On the other hand, an erase coil of the first magnetic transducer is wound around the third core leg portion or around a core bar bridging the first to third core leg portions.

Preferably, the magnetic transducer assembly further comprises a shield member constructed by adhering non-magnetic plates to both side surfaces of a magnetic plate and placed between the first and second magnetic transducers. More specifically, the shield member has a T-shaped configuration so as to be placed between the first read/write core assembly and the erase core assembly of the first magnetic transducer and the second read/write core assembly of the second magnetic transducer and further between the second and fourth core leg portions.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
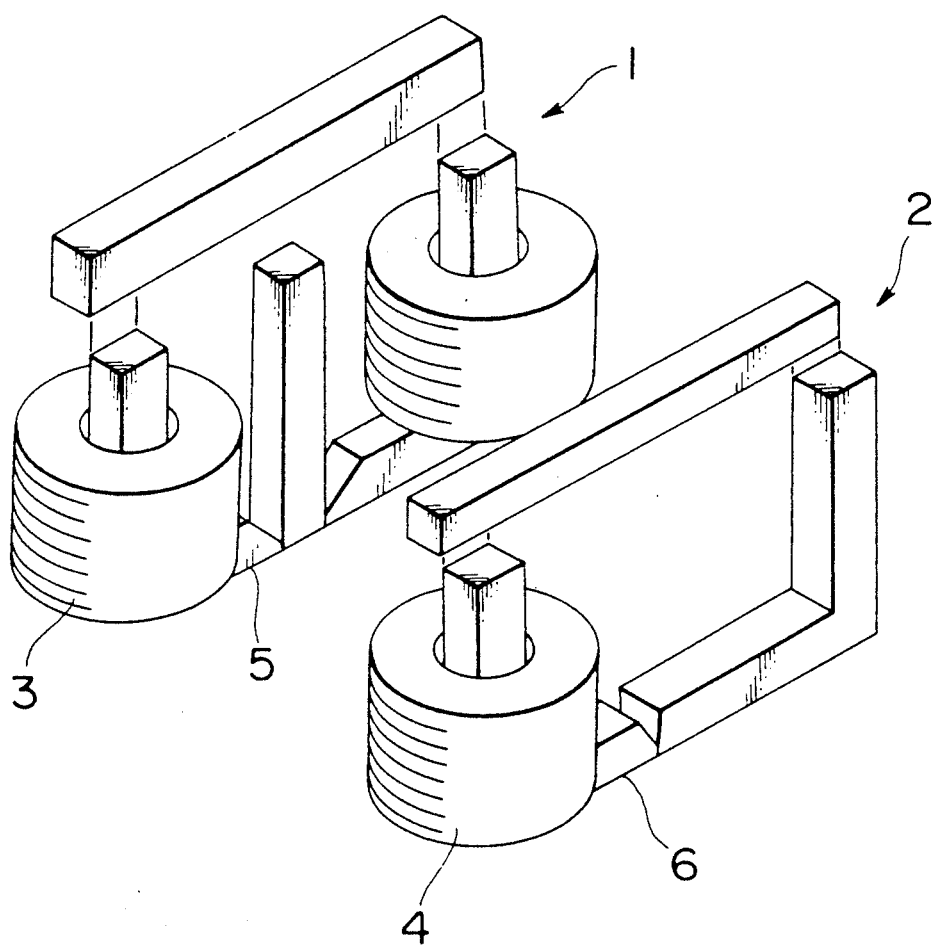
FIG. 1 is an exploded view partially showing an arrangement of a conventional magnetic recording transducer assembly.
Figure 2:
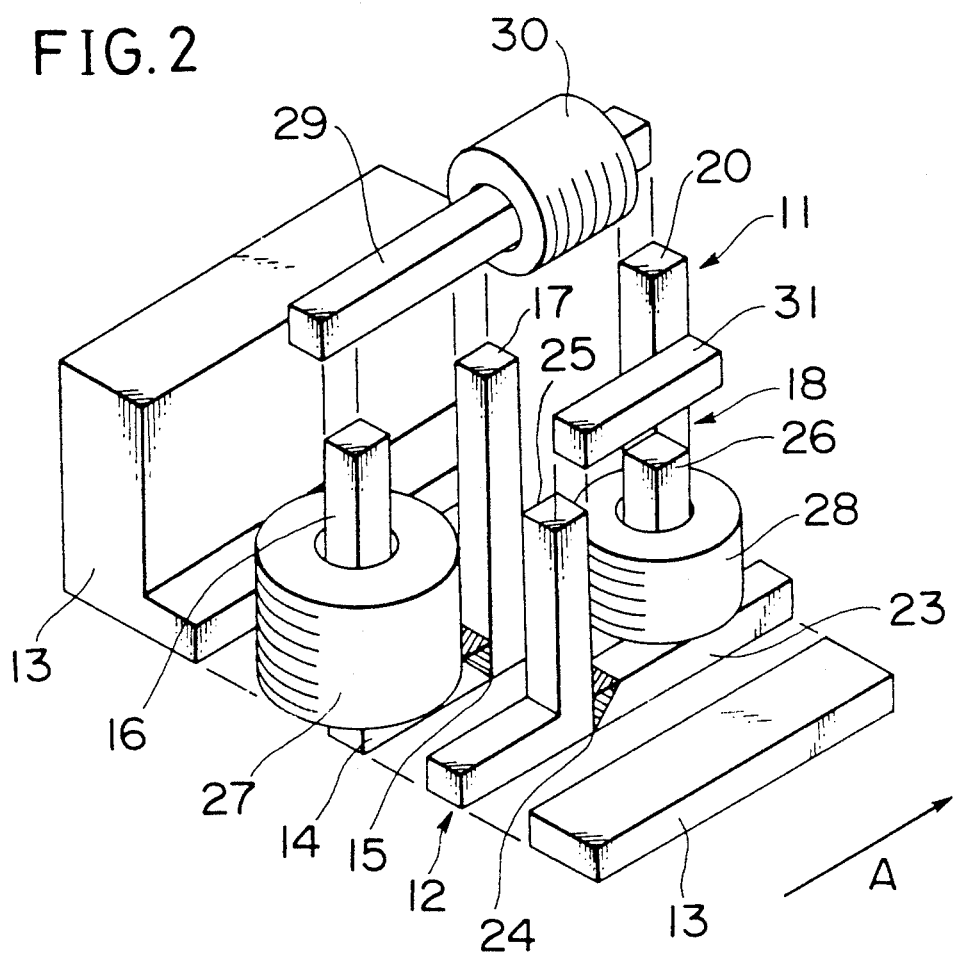
FIG. 2 is an exploded view illustrating an arrangement of a magnetic recording transducer assembly according to an embodiment of the present invention.

Referring now to FIG. 2, there is illustrated an arrangement of an magnetic recording transducer assembly according to an embodiment of the present invention. In FIG. 2, the magnetic recording transducer assembly comprises a low-density magnetic transducer 11 and a high-density magnetic transducer 12 which are incorporated into one rail of a double-rail type slider 13 in a manner wherein they are contiguous or adjacent to each other. Each rail has a contact surface coming into contact with a recording surface of a disc-like recording medium such as a floppy disk, not shown, in recording and reproducing. The low-density magnetic transducer 11 includes a read/write section and an erase section which are constructionally integrated with each other so as to be successively arranged in the rotational direction of the disc-like recording medium indicated by an arrow A in FIG. 2. The high-density magnetic transducer 12 includes a read/write section, but is not provided with an erase section because a high track-density recording can be attained by using a well known servo system.

Figure 3:
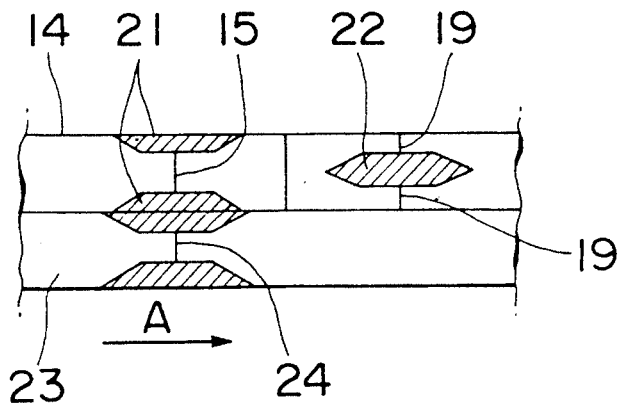
FIG. 3 is shows a read/write gap and an erase gap formed in a low-density magnetic transducer and another read/write gap formed in a high-density magnetic transducer.

The read/write section of the low-density magnetic transducer 11 has a read/write core assembly 14 comprising a L-shaped core and a I-shaped core, which are arranged in an abutting relationship to each other in the rotational direction A of the disc-like recording medium so as to form a read/write magnetic gap 15 extending in directions normal to the rotational direction A thereof. The L-shaped core comprises a vertical portion 16 acting as a first leg portion of the magnetic recording transducer assembly and a horizontal portion having a contact surface coming into contact with the recording surface of the disc-like recording medium. The I-shaped core serves as a second leg portion 17 of the transducer assembly. The first leg portion 16 is positioned at the front side of the magnetic recording transducer assembly and takes a precedent position with respect to the I-shaped core in the direction opposite to the rotational direction A of the disc-like recording medium with they being spaced from each other by a predetermined distance corresponding to the length of the horizontal portion of the L-shaped core of the read/write core assembly 14. The erase section of the low-density magnetic transducer 11 has an erase core assembly 18 comprising a L-shaped core which is arranged to be in an abutting relationship to the I-shaped core of the read/write core assembly 14 so as to form an erase gap 19, whereby the read/write gap 15 and the erase gap 19 are sequentially arranged in the rotational direction A of the disc-like recording medium as shown in FIG. 3. Similarly, the vertical portion of the L-shaped core of the erase core assembly 18 acts as a third leg portion 20 of the transducer assembly which is disposed to be on an extension line of the line leading from the first leg 16 to the second leg 17 so as to be spaced by a predetermined distance corresponding to the length of the horizontal portion of the L-shaped core of the erase core assembly 18 from the second leg portion 17. Here, the read/write core assembly 14 and the erase core assembly 18 may be manufactured to be united in a body.

As illustrated in FIG. 3, the read/write core assembly 14 has recessed portions near both end portions of the read/write gap 15 which recessed portions are filled with glass indicated at numeral 21 so as to precisely define the length of the read/write gap 15. Furthermore, the erase core assembly 18 has a recessed portion which is also filled with glass shown at numeral 22 so as to divide the erase gap 19 into two portions. With this arrangement, the edges of a newly written track are erased by the erase gap 19 immediately it is written by the read/write gap 15.

The read/write section of the high-density recording transducer 12 has a read/write core assembly 23 comprising a L-shaped core and a T-shaped core which are arranged in an abutting relationship to each other so as to form a read/write gap 24 whose length is shorter than that of the read/write gap 15. The read/write gap 24 is positioned s that its longitudinal axis is on a line passing through the longitudinal axis of the read/write gap 15 thereof as illustrated in FIG. 3. This arrangement causes the rotation angles (azimuth angle) and positions of the read/write gaps 15 and 24 to substantially become coincident with each other so as to ensure the interchangeability of the magnetic recording transducer assembly for different track-density media.

Figure 4A:
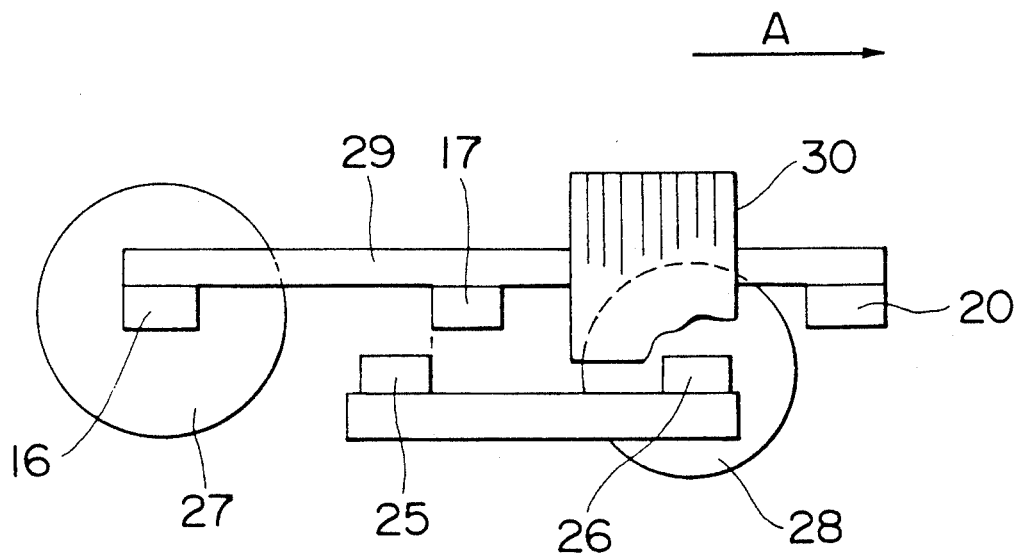
FIGS. 4A and 4B are illustrations for describing the relation in position between read/write coils and an erase coil.
Figure 4B:
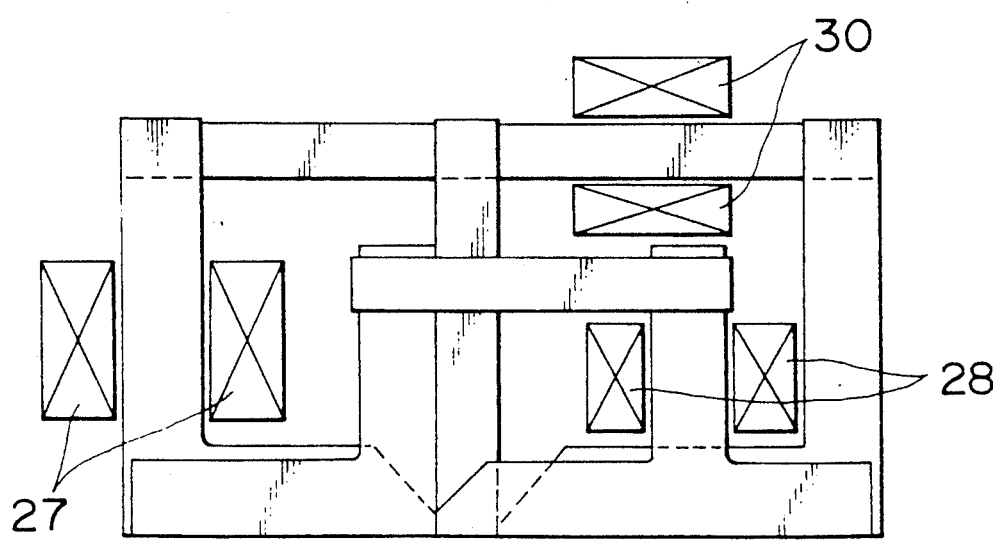
Figure 5A:
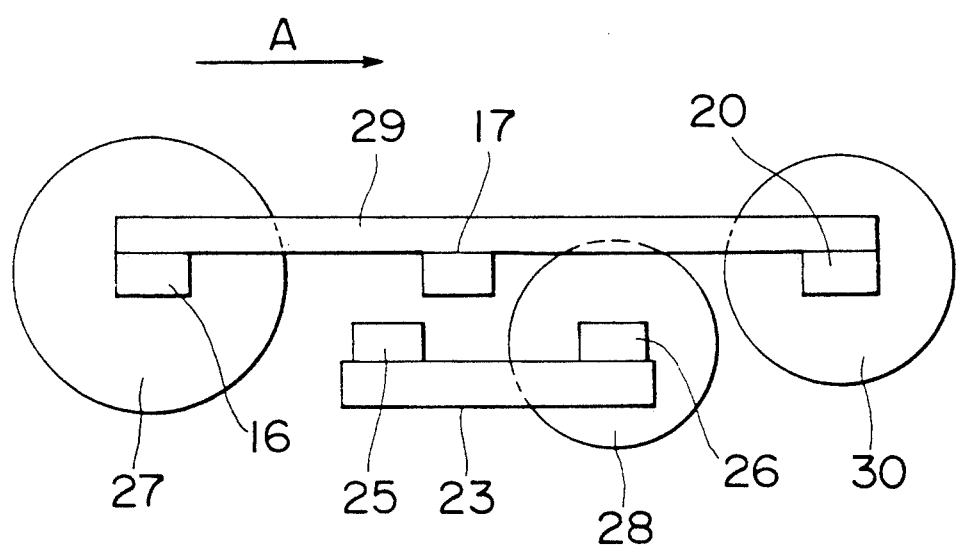
FIGS. 5A and 5B are illustrations for describing an arrangement to dispose an erase coil at a different position.
Figure 5B:
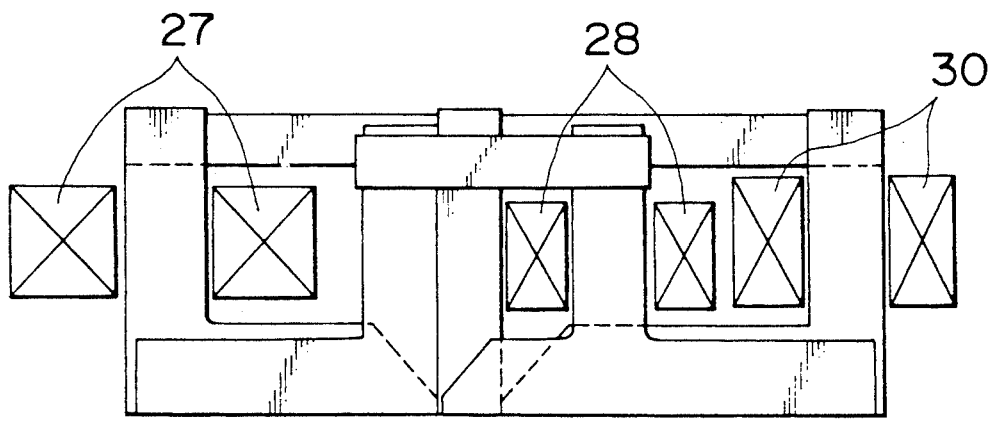

The vertical portion of the L-shaped core and the vertical portion of the T-shaped core constitute fourth and fifth leg portions 25 and 26 of the transducer assembly. Here, the read/write gap 24 is formed between the vertical portion, i.e., fourth leg portion 25, of the L-shaped core and the horizontal portion of the T-shaped core half so that the fourth leg 25 is positioned to be substantially between the first and second leg portions 16 and 17 in the rotational direction A of the disc-like recording medium. Furthermore, the vertical portion, i.e., fifth leg portion 26, of the T-shaped core is substantially positioned between the second and third leg portions 17 and 20 in the rotational direction A thereof. This arrangement provides spaces for a read/write coil 27 of the read/write section of the low-density recording transducer 11 to be wound around the first leg portion 16, and a read/write coil 28 of the read/write section of the high-density recording transducer 12 to be wound around the fifth leg portion 26 as shown in FIG. 4A (a partially top view showing the high-density magnetic transducer 11 and the low-density magnetic transducer 12) whereby the the low-density recording transducer 11 and the high-density recording transducer 12 can be arranged contiguous to one another without causing the two read/write coils 27 and 28 to come into contact with the other transducer in assembling. FIG. 4B is a cross-sectional view showing the relation in position between the read/write coils 27, 28 and the erase coil 30.

As illustrated in FIG. 2, the heights of the first to third leg portions 16, 17 and 20 in the low-density recording transducer 11 are arranged to be higher than those of the fourth and fifth leg portions 25 and 26 in the high-density recording transducer 12. The first to third leg portions 16, 17 and 20 are bridged with a back bar (bar-like core) 29 and an erase coil 30 is wound around the back bar 28 so as to be positioned between the second and third leg portions 17 and 20. In this instance, since the heights of the first to third leg portions 16, 17 and 20 are higher than those of the fourth and fifth leg portions 25, 26, the erase coil 30 can be easily wound around the back bar 29 so as not to come into contact with the read/write coil 28 of the high-density recording transducer 12 in assembling. The fourth and fifth leg portions 25, 26 are bridged with a back bar 31.

Here, if the length between second and third leg portions 17, 20 is allowed to be sufficiently long, the erase coil 30 can be provided around the third leg portion 20 as shown in FIG. 4A. FIG. 4B is a cross-sectional view showing relation in position between the erase coil 30 and the read/write coil 28 in the case that the erase coil 30 is wound around the third leg portion 20.

Figure 7A:
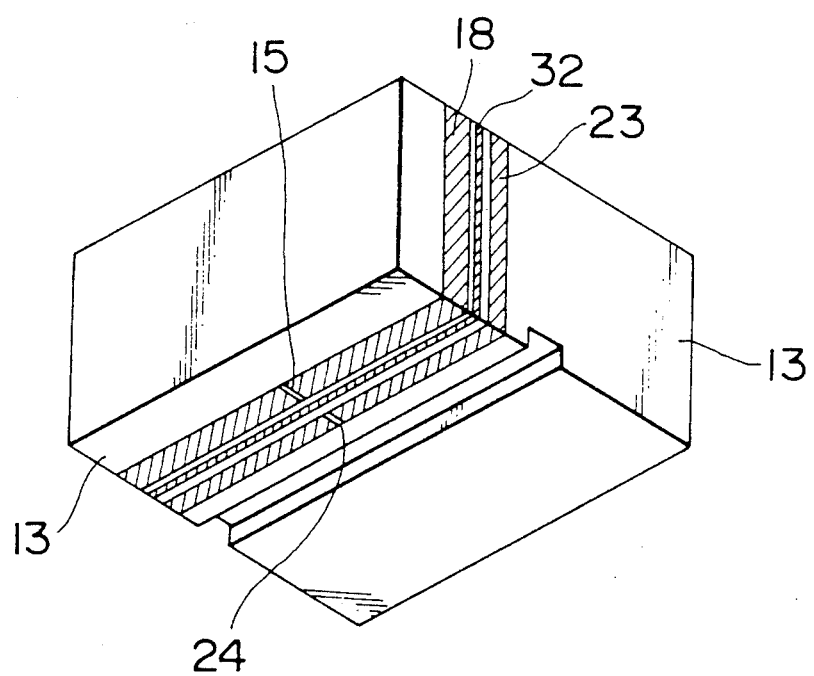
FIGS. 7A is a perspective view illustrating the FIG. 6 magnetic recording transducer assembly.
Figure 7B:
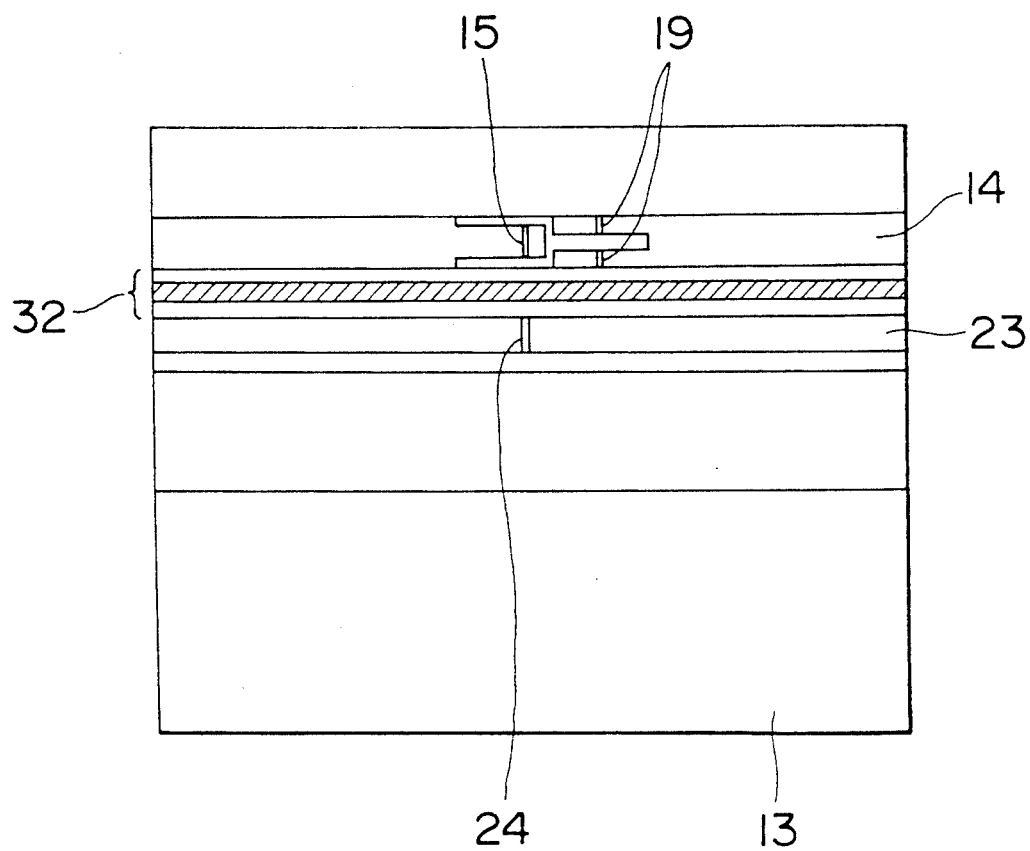
FIG. 7B is an illustration of the FIG. 6 magnetic recording transducer assembly viewed from the magnetic gap side.
Figure 8A:
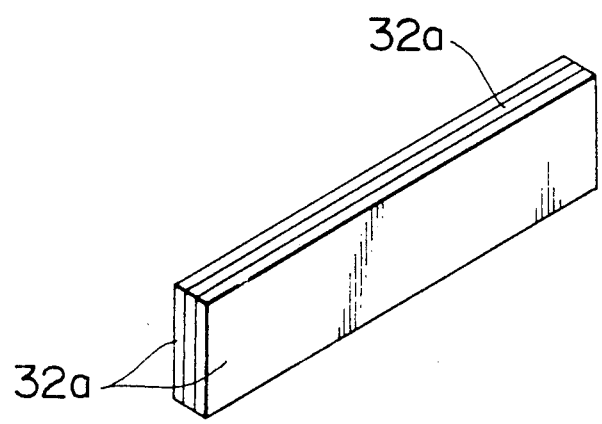
FIG. 8A shows a shield member to be placed between a high-density magnetic transducer and a low-density magnetic transducer.
Figure 8B:
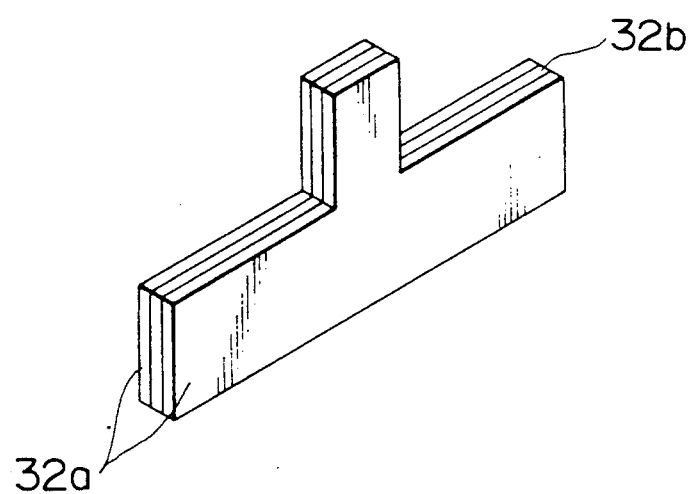
FIG. 8B shows a shield member having a shape different from that of FIG. 8A shield member.

A further embodiment of the present invention will be described hereinbelow with reference to FIGS. 6, 7A and 7B, FIG. 6 being an exploded view showing an arrangement of a magnetic recording transducer assembly of this embodiment, FIGS. 7A being a perspective view illustrating the magnetic recording transducer assembly and FIG. 7B being an illustration of the magnetic recording transducer assembly viewed from the magnetic gap side. Parts corresponding to those in FIG. 2 are marked with the same numerals and the description thereof will be omitted for brevity. One difference between the magnetic recording transducer assembly of FIG. 6 and the first-mentioned embodiment is that a shield member 31 is provided which prevents generation of crosstalk caused by signal readout of the low-density transducer 11 when the high-density transducer 12 is recording or reproducing a signal on or from a disc-like recording medium. The shield member 32 having a plate-like configuration is provided between the low-density transducer 11 and the high-density transducer 12 so that one surface thereof is brought into contact with surfaces of the read/write core assembly 14 and the erase core assembly 18 of the low-density transducer 11 and other surface thereof comes into contact with a surface of the read/write core assembly 23 of the high-density transducer 12. The shield member 32 is constructed by bonding non-magnetic plates 32a (for example, made of a ceramics) both surfaces of a magnetic plate 32b as shown in FIG. 8A. FIG. 8B shows another shield member having a T-shaped configuration. In the case of the FIG. 8B shield member, the protruding portion thereof is further placed between the second leg portion 17 of the read/write core assembly 14 and the fourth leg portion 25 of the read/write core assembly 23, thereby increasing the mechanical adhesion strength between the core assemblies 14, 23 and the shield member 32 concurrent with improving the crosstalk preventing effect.

Figure 6:
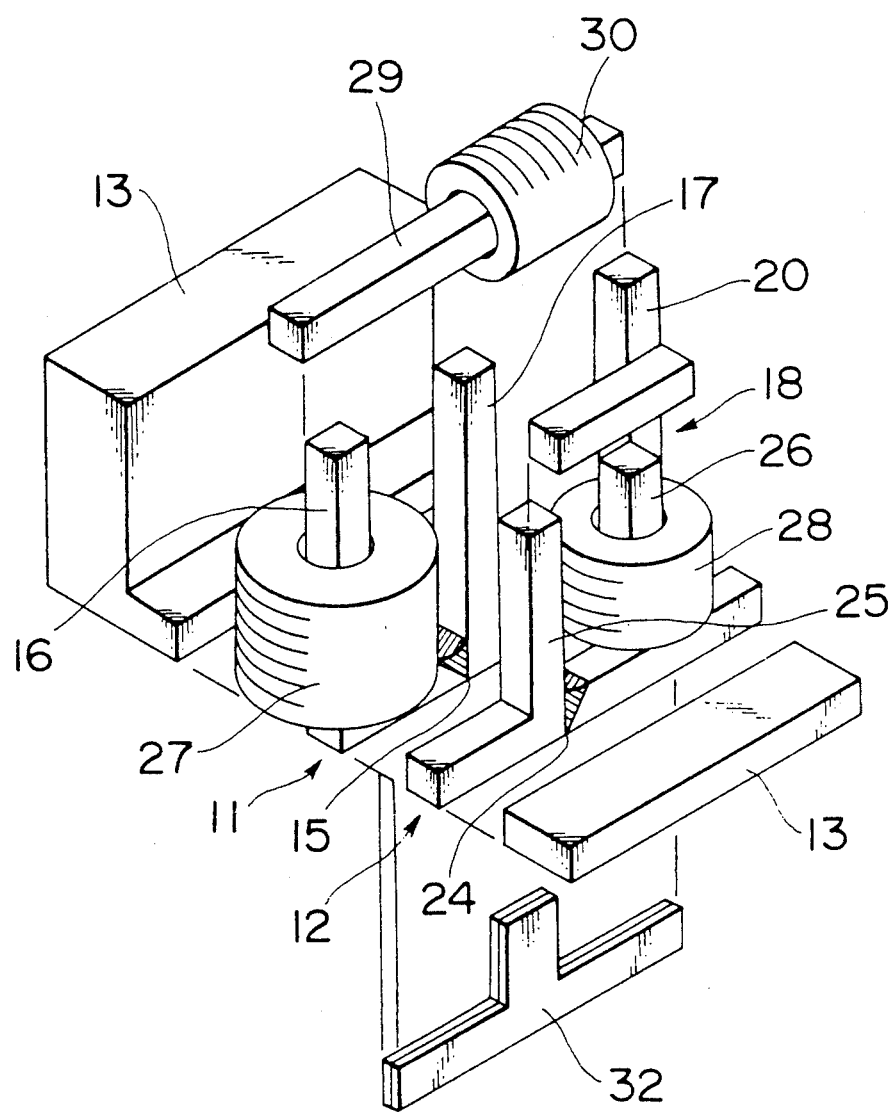
FIG. 6 is an exploded view showing an arrangement of a magnetic recording transducer assembly of another embodiment of this invention.
Figure 9:
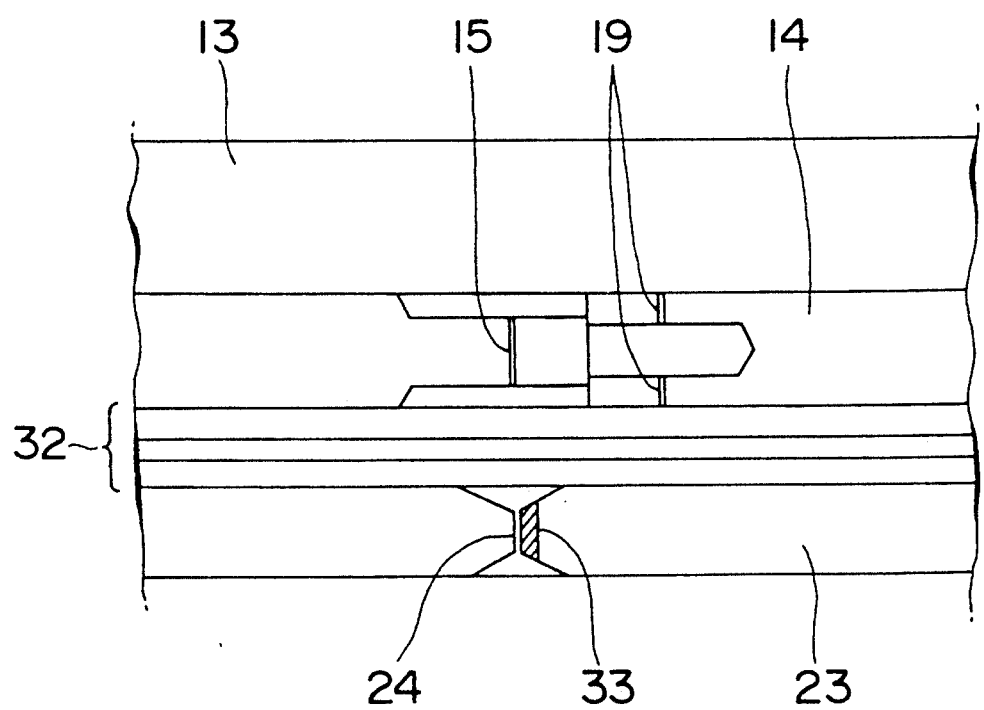
FIG. 9 illustrates a high-density magnetic transducer in which a metallic magnetic film is provided on a portion of a high-density core assembly facing a high-density magnetic gap.

FIG. 9 is an illustration of a further arrangement of the FIG. 6 magnetic recording transducer assembly of this invention in which a metallic magnetic film 33 is provided on at least one portion (or surface) of the read/write core assembly 23, facing the magnetic gap 24, so as to obtain highly improved recording and reproduction characteristics. This arrangement allows heightening the recording density.

It should be understood that the foregoing relates to only preferred embodiments of the present invention, and that it is intended to cover all changes and modifications of the embodiments of this invention herein used for the purposes of the disclosure, which do not constitute departures from the spirit and scope of the invention.

What is claimed is:

1. A magnetic transducer assembly for cooperating with a relatively moving magnetic recording medium to magnetically record and reproduce information on and from said magnetic recording medium, said transducer assembly comprising:

double-rail type slider means including two rails which are arranged to be substantially parallel to each other and to extend in a direction of movement of said recording medium, each rail having a contacting surface with a recording surface of said recording medium in recording and reproducing;

a first magnetic transducer including a first read/write core assembly having a first magnetic gap extending in directions normal to the moving direction of said recording medium to write a track of information on said recording medium, said first magnetic transducer being incorporated in one of said rails of said slider means so that said first magnetic gap is placed in a plane including said contacting surface of said rail thereof, said first read/write core assembly including first and second core leg portions which extend in directions normal to said recording surface of said recording medium and which are spaced by a predetermined distance from each other, said first magnetic transducer further including an erase core assembly including a third core leg portion which extends in a direction normal to said recording surface thereof and which is positioned to be spaced by a predetermined distance from said second core leg portion in the moving direction of said recording medium; and a second magnetic transducer including a second read/write core assembly having a second magnetic gap which is different in length from said first magnetic gap and which extends in directions normal to the moving direction of said recording medium to write another track of information on said recording medium, said second magnetic transducer being incorporated in the one of said rails of said slider means so as to be adjacent to said first magnetic transducer, said second magnetic gap being positioned in said plane including said contacting surface of said rail thereof and arranged so that its longitudinal axis is on an extension line of the longitudinal axis of said first magnetic gap, said second read/write core assembly including fourth and fifth core leg portions which extend in directions normal to said recording surface thereof and which are spaced by a predetermined distance from each other, said fourth core leg portion being positioned between said first and second core leg portions in the moving direction of said recording medium and said fifth core leg portion being positioned between said second and third core leg portions in the moving direction thereof.

2. A magnetic transducer assembly as claimed in claim 1, wherein said erase core assembly has an erase gap which is arranged to be in contacting relationship to said first read/write core assembly in the moving direction of said recording medium so as to erase the edges of the written track immediately after it is written by said first magnetic gap.

3. A magnetic transducer assembly as claimed in claim 1, wherein a metallic magnetic film is provided on at least one portion of said second read/write core assembly facing said second read/write magnetic gap.

4. A magnetic transducer assembly as claimed in claim 1, wherein said first core leg portion is positioned to precede said second core leg portion in the direction opposite to the moving direction of said recording medium, said first to third core leg portions are successively arranged in order along one line, and said fourth core leg portion is positioned to precede said fifth core leg portion in the direction opposite to the moving direction of said recording medium whereby said fourth and fifth core leg portions are arranged in order along one line.

5. A magnetic transducer assembly as claimed in claim 4, further comprising a shield member constructed by adhering non-magnetic plates to both side surfaces of a magnetic plate, said shield member being placed between said first and second magnetic transducers.

6. A magnetic transducer assembly as claimed in claim 5, said shield member has a T-shaped configuration so as to be placed between said first read/write core assembly and said erase core assembly of said first magnetic transducer and said second read/write core assembly of said second magnetic transducer and further between said second and fourth core leg portions.

7. A magnetic transducer assembly as claimed in claim 4, wherein a read/write coil of said first magnetic transducer is wound around said first core leg portion and a read/write coil of said second magnetic transducer is wound around said fifth core leg portion.

8. A magnetic transducer assembly as claimed in claim 7, wherein an erase coil of said first magnetic transducer is wound around said third core leg portion.

9. A magnetic transducer assembly as claimed in claim 7, wherein said first to third core leg portions are bridged with a core bar and an erase coil of said first magnetic transducer is wound around said core bar at a position between said second and third core leg portions.

* * * * *